US00RE41886E

(19) United States
(12) Reissued Patent
Marple

(10) Patent Number: US RE41,886 E
(45) Date of Reissued Patent: Oct. 26, 2010

(54) NONAQUEOUS ELECTROCHEMICAL CELL WITH IMPROVED ENERGY DENSITY

(75) Inventor: Jack W. Marple, Avon, OH (US)

(73) Assignee: Eveready Battery Company, Inc., St. Louis, MO (US)

(21) Appl. No.: 11/707,855

(22) Filed: Feb. 16, 2007

Related U.S. Patent Documents

Reissue of:
(64) Patent No.: 7,157,185
Issued: Jan. 2, 2007
Appl. No.: 10/977,775
Filed: Oct. 29, 2004

U.S. Applications:
(

(63) Continuation of application No. 10/164,239, filed on Jun. 5, 2002, now Pat. No. 6,849,360.

(51) Int. Cl.
*H01M 4/58* (2006.01)
*H01M 4/40* (2006.01)
*H01M 4/62* (2006.01)
*H01M 10/0587* (2006.01)

(52) U.S. Cl. ..... 429/94; 429/217; 429/224; 429/231.95; 429/232

(58) Field of Classification Search ..... 429/60, 429/94, 217, 221, 232, 231.95
See application file for complete search history.

(56) References Cited

U.S. PATENT DOCUMENTS 3,679,538 A 7/1972 Druin et al.
3,907,589 A 9/1975 Gay et al.
3,933,520 A 1/1976 Gay et al.
3,951,685 A 4/1976 Kronenberg
3,996,069 A 12/1976 Kronenberg
4,048,402 A 9/1977 Kronenberg
4,049,882 A * 9/1977 Beatty ..... 429/94
4,049,892 A 9/1977 Kronenberg
4,129,686 A 12/1978 Kaduboski
4,143,217 A * 3/1979 Joo' et al. ..... 429/221
4,163,829 A 8/1979 Kronenberg
4,208,473 A 6/1980 Bradley
4,230,549 A 10/1980 D'Agostino et al.
4,238,554 A 12/1980 Barrella
4,298,665 A 11/1981 Evans et al.
4,301,220 A 11/1981 Evans et al.
4,302,520 A 11/1981 Evans et al.
4,327,166 A 4/1982 Leger
4,379,815 A 4/1983 Bubnick
4,386,019 A 5/1983 Kaun et al.
4,390,604 A 6/1983 Evans et al.
4,399,204 A 8/1983 Clark
4,444,857 A 4/1984 Duchange et al.
4,446,212 A 5/1984 Kaun
4,450,214 A 5/1984 Davis
4,465,747 A 8/1984 Evans
4,478,921 A 10/1984 Langan
4,482,615 A 11/1984 Rosansky et al.
4,489,144 A 12/1984 Clark
4,499,161 A 2/1985 Foos
4,524,115 A 6/1985 Paulson et al.
4,536,456 A 8/1985 Evans
4,618,548 A 10/1986 Brule
4,624,902 A 11/1986 deNeufville et al.
4,626,335 A 12/1986 Cupp et al.
4,654,281 A 3/1987 Anderman et al.
4,672,010 A 6/1987 Tucholski et al.
4,675,256 A 6/1987 Winchester et al.
4,675,257 A 6/1987 Winchester
4,683,181 A 7/1987 Armand et al.
4,687,716 A 8/1987 Nagaura
4,707,422 A 11/1987 de Neufville et al.
4,735,875 A 4/1988 Anderman et al.
4,761,487 A 8/1988 Godshall
4,764,437 A 8/1988 Kaun
4,770,960 A 9/1988 Nagaura et al.
4,794,057 A 12/1988 Griffin
4,804,595 A 2/1989 Bakos et al.
4,808,497 A 2/1989 Blomgren et al.
4,851,306 A 7/1989 Kaun et al.
4,855,195 A 8/1989 Georgopoulos et al.
4,861,573 A 8/1989 de Neufville et al.
4,913,988 A 4/1990 Langan
4,935,316 A 6/1990 Redey
4,952,330 A 8/1990 Leger et al.

4,963,446 A * 10/1990 Roels et al. ..... 429/94
4,971,868 A 11/1990 Tucholski et al.
4,975,341 A 12/1990 Tucholski et al.
4,981,672 A 1/1991 de Neufville et al.
5,006,429 A 4/1991 Pracchia et al.
5,051,183 A 9/1991 Takita et al.
5,075,990 A 12/1991 Greenberg et al.
5,114,811 A 5/1992 Ebel et al.
5,116,701 A 5/1992 Kalisz
5,128,220 A 7/1992 O'Hara et al.
5,143,805 A 9/1992 Anderman et al.
5,158,722 A 10/1992 Ilic et al.
5,162,172 A 11/1992 Kaun
5,173,235 A 12/1992 Kamei et al.
5,206,456 A 4/1993 Pracchia et al.
5,219,683 A 6/1993 Webber
5,229,227 A 7/1993 Webber
5,262,255 A 11/1993 Ito et al.
5,290,414 A 3/1994 Marple
5,397,661 A 3/1995 Kaun
5,401,593 A 3/1995 Jones et al.
5,418,084 A 5/1995 Georgopoulos
5,432,030 A 7/1995 Vourlis
5,458,997 A 10/1995 Crespi et al.
5,514,491 A 5/1996 Webber
5,529,858 A 6/1996 Wicker et al.
5,536,600 A 7/1996 Kaun
5,543,249 A 8/1996 Takeuchi et al.
5,569,553 A 10/1996 Smesko et al.
5,604,051 A 2/1997 Pulley et al.
5,667,916 A 9/1997 Ebel et al.
5,691,083 A 11/1997 Bolster
5,695,892 A 12/1997 Leising et al.
5,716,728 A 2/1998 Smesko et al.
5,736,275 A 4/1998 Kaun
5,830,603 A 11/1998 Oka et al.
5,856,043 A 1/1999 Ohsaki et al.
5,895,730 A 4/1999 Ritchie
5,932,375 A 8/1999 Tarcy et al.
5,935,724 A 8/1999 Spillman et al.
5,935,728 A 8/1999 Spillman et al.
6,068,950 A 5/2000 Gan et al.
6,083,644 A 7/2000 Watanabe et al.
6,087,809 A 7/2000 Gan et al.
6,096,447 A 8/2000 Gan et al.
6,117,591 A 9/2000 Takeuchi et al.
6,136,477 A 10/2000 Gan et al.
6,153,338 A 11/2000 Gan et al.
6,165,638 A 12/2000 Spillman et al.
6,171,729 B1 1/2001 Gan et al.
6,174,629 B1 1/2001 Gan et al.
6,200,701 B1 3/2001 Gan et al.
6,203,942 B1 3/2001 Gan et al.
6,203,947 B1 3/2001 Peled et al.
6,218,054 B1 4/2001 Webber
6,245,464 B1 6/2001 Spillman et al.
6,251,308 B1 6/2001 Butler
6,258,473 B1 7/2001 Spillman et al.
6,265,103 B1 * 7/2001 Shacklett et al. ..... 429/167 X
6,265,106 B1 7/2001 Gan et al.
6,274,269 B1 8/2001 Gan et al.
6,306,544 B1 10/2001 Frysz et al.
6,335,114 B1 * 1/2002 Ueshima et al. ..... 429/94
6,346,349 B1 2/2002 Briscoe et al.
6,391,488 B1 * 5/2002 Shimizu et al. ..... 429/94
6,392,385 B1 5/2002 Barker et al.
6,399,246 B1 6/2002 Vandayburg et al.
6,451,483 B1 9/2002 Probst et al.
6,455,202 B1 9/2002 Marugan et al.
6,495,285 B2 12/2002 Gan et al.
6,511,772 B2 1/2003 Gan et al.
6,541,158 B2 4/2003 Frysz et al.
6,551,747 B1 4/2003 Gan
6,586,135 B2 7/2003 Gan et al.
6,593,029 B2 7/2003 Spillman et al.
6,605,385 B2 8/2003 Gan et al.
6,616,715 B2 9/2003 Kitoh et al.
6,627,337 B2 9/2003 Gan et al.
6,627,353 B1 9/2003 Munshi
6,645,671 B2 11/2003 Tsutsumi et al.
6,673,493 B2 1/2004 Gan et al.
6,677,077 B2 1/2004 Spillman et al.
6,692,865 B2 2/2004 Gan et al.
6,692,871 B2 2/2004 Gan et al.
6,730,136 B2 5/2004 Webber
6,730,437 B2 5/2004 Leising et al.
6,759,164 B2 7/2004 Palazzo et al.
6,780,542 B2 8/2004 Spillman et al.
6,811,926 B2 11/2004 Phillips
6,849,360 B2 2/2005 Marple
6,884,544 B2 4/2005 Barker et al.
6,936,379 B2 8/2005 Gan et al.
6,991,874 B1 * 1/2006 Mohwald et al. ..... 429/129
2003/0124427 A1 7/2003 Takeuchi et al.
2003/0228518 A1 12/2003 Marple
2004/0009401 A1 1/2004 Saharan et al.
2004/0018430 A1 1/2004 Hollman et al.
2005/0084756 A1 4/2005 Marple
2005/0112462 A1 5/2005 Marple

FOREIGN PATENT DOCUMENTS

EP 529802 A1 3/1993
EP 567506 B1 11/1993
EP 567506 10/1996
EP 0872908 A1 10/1998
EP 0930664 A2 7/1999
GB 2160705 A 12/1985
JP 55154067 A 12/1980
JP 56-79859 6/1981
JP 56079859 6/1981
JP 60160566 A 8/1985
WO WO 00/67338 11/2000
WO WO01/35475 5/2001
WO WO 03/30279 A2 4/2003

OTHER PUBLICATIONS

PCT International Search Report PCT/US03/17728, 8 pages.

PCT Written Opinion PCT/US03/17728, 5 pages.

Apostolova et. al., "Anticorrosive electrically conductive additives to the cathodic paste of Li/FeS2 batteries," Zhurnal Prikladnoi Khimii (Sankt–Peterburg, Russian Federation) (1991), 64(1), 58–65.

Bernardi et al., "Mathematical modeling of lithium(alloy), iron disulfide cells," Journal of the Electrochemical Society (1987), 134(6), 1309–18.

Birt et al., "Characteristics of the aluminum–lithium/iron sulfide cells in immobilized salt electrolytes," Proceedings of the Power Sources Symposium (1978), 28th, 14–16.

Briscoe et. al., "Thermal model for design analysis of LiAl/FeS2 thermal batteries," Proceedings of the International Power Sources Symposium (1986), 32nd, 686–91.

Briscoe, "An improved thermal battery for military applications," Proceedings of the Power Sources Conference (1998), 38th, 235–239.

Cupp, "Lithium–metal sulfide cells and battery development progress at Eagle–Pitcher Industries," Proceedings of the Intersociety Energy Conversion Engineering Conference (1982), 17$^{th}$ (vol. 2), 535–7.

Dallek, "Decomposition kinetics and purity of thermal battery FeS2 cathode material by thermogravimetry," Proceedings of the International Power Sources Symposium (1986), 32nd, 643–7.
Dunning et. al., "Development of compact lithium/iron disulfide electrochemical cells," Proceedings of the Intersociety Energy Conversion Engineering Conference (1976), 11, vol. 1, 491–6.
Gay et al., "Electrode designs for high performance lithium–aluminum/iron sulfide cells," Power Sources (1977), 6, 735–49.
Gay et al., "Performance characteristics of solid lithium–aluminum alloy electrodes," Journal of the Electrochemical Society (1976), 123(11), 1591–6.
Gay et al., "The development of lithium/sulfur cells for application to electric automobiles," Intersoc. Energy Convers. Eng. Conf. Proc., 9th (1974), 862–7.
Golodnitsky et al., "Pynite as cathode insertion material in rechargeable lithium/composite polymer electrolyte batteries," Electrochimica Acta (1999), 45(1–2), 335–350.
Giuidotti et al., "Screening study of lithiated catholyte mixes for a long–life lithium (silicon)/iron sulfide (FeS2) thermal battery," Report (1988), SAND–85–1737; Order No. DE89006857. 84 pp.
Guidotti et. al., "Thermal–sprayed, thin–film pyrite cathodes for thermal batteries—discharge–rate and temperature studies in single cells," Sandia National Laboratories (2000); Order No. DE00756401, 9 pp.
Hansen et al. "Lithium insertion into iron sulfides," Proceedings—Electrochemical Society (1997), 97–18 (Batteries for Portable Applications and Electric Vehicles), 124–132.
Kaun et al., "Development of a high–rate, rechargeable bipolar LiAl/FeS2 battery," Proceedings of the Power Sources Conference (1996), 37th, 338–341.
Kaun et al., "Lithium/disulfide cells capable of long cycle life," Proceedings—Electrochemical Society (1989), 89–4(Proc. Symp. Mater. Processes Lithium Batteries, 1988), 373–82.
Kaun et al., "Modification of LiCl–LiBr–KBr electrolyte for LiAl–FeS2 batteries," Proceedings—Electrochemical Society (1996), 96–7(Molten Salts), 342–354.
Kaun, "Li–Al/FeS2 cell with LiCl–LiBr–KBr Electrolyte," Journal of the Electrochemical Society (1985), 132(12), 3063–4.
Kaun et al., Rechargeable thermal battery for portable application, Proceedings of the Power Sources Conference (1998), 38th, 244–247.
Kaun, "A stable, high performance lithium/iron disulfide cell with LiCl–LiBr–KBr molten electrolyte," Proceedings of the Intersociety Energy Conversion Engineering Conference (1986), 21st (vol. 2), 1048–51.
Kaun, "An advanced lithium–aluminum/iron disulfide secondary cell," Proceedings of the International Power Sources Symposium (1986), 32nd, 16–22.
Kaun, "Evaluation of lithium bromide–lithium chloride–potassium bromide electrolyte for lithium–alloy/metal disulfide cells," Proceedings—Electrochemical Society (1987), 87–7 (Proc. Jt. Int. Symp. Molten Salts), 621–30.
Kostov et al., "X–ray absorption fine structure studies of FeS2 cathodes in lithium polymer electrolyte batteries," Journal of Power Sources (1999), 81–82, 709–714.
Lewis et al., "Aging effects and failure modes in thermal batteries," Proceedings of the Power Sources Conference (1994), 36th, 318–20.
Lin et al., "Performance of LiAl/Lil(Al2O3)/FeS2 thermal batteries," Proceedings of the International Power Sources Symposium (1986), 32nd, 664–9.
Livshits et al., "Development of a bipolar Li/composite polymer electrolyte/pyrite battery for electric vehicles," Journal of Power Sources (2001), 97–98, 782–785.
Mason et al., "Modeling and optimization of lithium–alloy–metal–sulfide molten salt batteries," Report (1988), LBL–26159; Order No. DE89002308, 119 pp.
Peled et al., "Li/CPE/FeS2 rechargeable battery," Electrochimica Acta (1998), 43(10–11), 1593–1599.
Redey et. al., "Investigation of primary lithium–silicon/iron sulfide (FeS2) cells," Argonne National Laboratory (1987), ANL–87–6; Order No. DE87010243, 49 pp.
Seefurth et al., "Dependence of lithium–silicon electrode potential and lithium utilization on reference electrode location," Journal of the Electrochemical Society (1980), 127(5), 1101–4.
Shao–Hom et al., "Chemical, structural and electrochemical comparison of natural and synthetic FeS2 pyrite in lithium cells," Electrochemical Acta (2001), 46(17), 2613–2621.
Shao–Hom et al., "Nano–FeS2 for Commercial Li/FeS2 Primary Batteries," Journal of the Electrochemical Society (2002), 149(11) A1499–A1502.
Shao–Hom et al., "Reinvestigation of Lithium Reaction Mechanisms in FeS2 Pyrite at Ambient Temperature," Journal of the Electrochemical Society (2002), 149 (12) A1547–A1555.
Shembel et al., "Effects of material balance component on the efficiency of solid–oxidant lithium batteries," Zhumal Prikladnoi Khimii (Sankt–Peterburg, Russian Federation) (1991), 64(1), 65–70.
Shimotake et al., "Development of a compact, high–capacity FeS2 electrode," Preprints of Papers—American Chemical Society, Divisional Fuel Chemistry (1974), 19(5), 59–66.
Shuben et, al., "Review of recent development in lithium aluminium alloy–iron disulfide thermal battery," Dianyuan Jishu (1999), 23(3), 198–200 (abstract).
Strauss et. al., "Cathode modification for improved performance of rechargeable lithium/composite polymer electrolyte–pyrite battery," Electrochemical and Solid–State Letters (1999), 2(3), 115–117.
Strauss et. al., "Study of the high–voltage spike in lithium/polymer electrolyte/pyrite rechargeable batteries," Reviews in Analytical Chemistry (1999), 18(5), 261–268.
Strauss et. al., "Improved materials and processes for rechargeable Li/CPE/FeS2 battery for EV applications," Proceedings—Electrochemical Society (1997), 97–18(Batteries for Portable Applications and Electric Vehicles), 133–140.
Strauss et. al., "Study of phase changes during 500 full cycles of Li/composite polymer electrolyte/FeS2 battery," Electrochimica Acta (2000), 45(8–9), 1519–1525.
Strauss et. al., "Lithium polymer electrolyte pyrite rechargeable battery: comparative characterization of natual pyrite from different sources as cathode material," Journal of Power Sources (2000), 88(2), 206–218.
Terasaki et al., "Single cell discharge characteristics of lithium aluminum/ iron disulfide thermal batteries," GS News Technical Report (1986), 45(1), 31–4.
Vissers et. al., "Molten salt electrolytes for high–temperature lithium cells," Journal of Power Sources (1989), 26(1–2), 37–48.

Walsh et al., "Development of prototype lithium/sulfur cells for application to load–leveling devices in electric utilities," Intersoc. Energy Convers. Eng. Conf. Proc., 9th (1974), 911–15.
Winchester, "The LAN/iron sulfide (FeS2) thermal battery system," Proceedings of the Power Sources Symposium (1982), 30th, 23–7.
Yokoyama et. al., "Iron disulfide–cupric oxide/lithium button cell as a 1.5–volt power source," Progress in Batteries & Solar Cells (1987), 6, 38–42.
"Development of lithium/metal sulfide batteries at Argonne National Laboratory: Summary Report for 1976," (1977), ANL–77–18, 30 pp.
M.B. Clark, "Lithium–Iron Disulfide Cells," *Lithium Batteries* pp. 115–136 (Edited by Jean–Paul Gabano, 1983) (Clark), no month.
Complaint for Patent Infringement, *Energizer* v. *Spectrum,* U.S. District Court of Western District of Wisconsin, Case No. 08–CV–00431, dated Jul. 25, 2008, 5 pages (without exhibits).
Answer and Affirmative Defenses, *Energizer* v. *Spectrum,* U.S. District Court of Western District of Wisconsin, Case No. 08–CV–00431, dated Aug. 18, 2008, 8 pages.
Declaration of Robert Spotnitz for Spectrum Brands, *Energizer* v. *Spectrum,* U.S. District Court of Western District of Wisconsin, Case No. 08–CV–00431, signed Oct. 1, 2008, 42 pages (excluding exhibits).
Second Declaration of Ralph E. White in Support of Energizer's Motion for Preliminary Injuction, *Energizer* v. *Spectrum,* U.S. District Court of Western District of Wisconsin, Case No. 3:08–cv–00431–bbc, signed Oct. 17, 2008, 57 pages (including exhibits).
Transcript of Preliminary Injunction Hearing of Oct. 30, 2008, *Energizer* v. *Spectrum,* U.S. District Court of Western District of Wisconsin, Case No. 08–CV–00431, 108 pages.
"Handbook of Batteries and Fuel Cells," David Linden, Editor in Chief, © 1984, pp. 19–24, (no month).
Translation of Opposition—Statement of Facts by Koninklijke Philips Electronics N.V., Aug. 12, 2008, 13 pages.
Translation of Opposition—Supplement to the Statement of Facts of Aug. 12, 2008 by Kroninklijke Philips Electronics N.V., Aug. 20, 2008, 7 pages.
Opposition by The Gillette Company, Jan. 30, 2009, 8 pages.
Opposition by Spectrum Brands, Inc., Statement of Facts, Feb. 23, 2009, 8 pages.
*Therasense, Inc.* v. *Becton,* 2010 WL 254904 (C.A. Fed. (Cal.)).
*Ex parte Tanaka,* decided Dec. 9, 2009 by the Board of Patent Appeals and Interferences, precedential deision.
Opposition supporting document E27 by Koninklijke Philips Electronics N.V., Sep. 18, 2009.
Opposition supporting document E28 by Koninklijke Philips Electronics N.V., Sep. 18, 2009.
Opposition by Koninklijke Philips Electronics N.V., Sep. 18, 2009.
Opposition by Koninklijke Philips Electronics N.V., Aug. 3, 2009.
Opposition by Spectrum Brands, Inc., Oct. 23, 2009.
Opposition by Eveready Battery Company, Inc., Jul. 29, 2009.

* cited by examiner

*Primary Examiner*—Stephen J. Kalafut
(74) *Attorney, Agent, or Firm*—Robert C. Baraona

(57) ABSTRACT

This invention relates to a nonaqueous cell comprising a lithium metallic foil anode and a cathode coating comprising iron disulfide as the active material wherein the coating is applied to at least one surface of a metallic substrate that functions as the cathode current collector. In particular, the cell of the within invention has improved performance on high rate discharge and is achieved, surprisingly, with an anode underbalance. The cell of the within invention has an anode to cathode input that is less than or equal to 1.0. We have discovered, unexpectedly, that the energy density for the cell both volumetrically and gravimetrically can be improved by approximately 20 to 25% while only increasing the volume of the cathode coating solids by approximately 10% through a unique and novel cathode coating formulation used in conjunction with a lithium foil anode.

65 Claims, 1 Drawing Sheet

NONAQUEOUS ELECTROCHEMICAL CELL WITH IMPROVED ENERGY DENSITY

Figure 1:
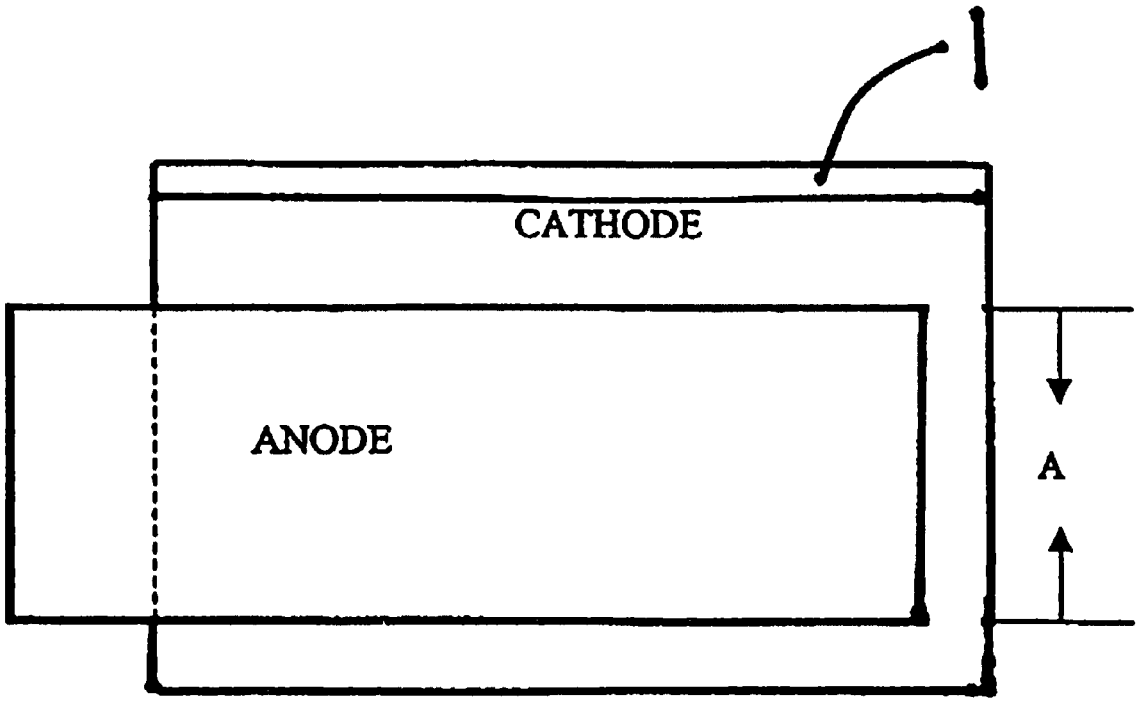

Matter enclosed in heavy brackets [ ] appears in the original patent but forms no part of this reissue specification; matter printed in italics indicates the additions made by reissue.

*More than one reissue application has been filed for the reissue of U.S. Pat. No. 7,157,185. The reissue applications are the present application and application Ser. No. 12/404,853, filed on Mar. 16, 2009. Application Ser. No. 12/404,853, now abandoned, is a continuation reissue application of the present reissue application.*

CROSS-REFERENCE TO RELATED APPLICATIONS

This application is a continuation of U.S. patent application Ser. No. 10/164,239, filed Jun. 5, 2002, entitled Nonaqueous Electrochemical Cell with Improved Energy Density, now U.S. Pat. No. 6,849,360, which is incorporated herein by this reference.

FIELD OF THE INVENTION

This invention relates to a nonaqueous cell, such as a cell wherein lithium is the active anode material and iron disulfide or pyrite is the active cathode material. More particularly, this invention relates to such a cell wherein the anode to cathode input ratio is less than or equal to 1.0.

BACKGROUND

The electrochemical couple of a lithium metal anode with a pyrite or iron disulfide cathode has long been recognized as a theoretically high-energy couple. Hereinafter, "pyrite" and "iron disulfide" will be used interchangeably. Lithium metal possesses the lowest density of any metal and provides a volumetric energy density of 2062 mAh/cubic centimeter and a gravimetric energy density of 3861.7 mAh/gram. Pyrite offers advantageous energy opportunities as a result of its ability to undergo a four electron reduction, and has a volumetric energy density of 4307 mAh/cubic centimeter and a gravimetric energy density of 893.58 mAh/gram.

There are however many challenges in achieving a commercially viable cell with this particular electrochemical couple. One key challenge is how to use internal cell volume efficiently. It is known that this electrochemical system results in a volume increase upon discharge and the accompanying formation of reaction products. It is therefore necessary that the cell design incorporate sufficient void volume to accommodate this volume increase. It will be appreciated then, that as the discharge efficiency of the cell increases, additional reaction products will be generated causing incremental volume increases that must be accommodated by the incorporation of sufficient void volume within the cell.

Attempts to improve the energy density of the cell by increasing the density of the cathode present additional challenges. First, it will be appreciated that an increase in the density of the cathode will result in less void volume within this electrode to accommodate the reaction products, in turn requiring that alternative void sites within the cell be provided. Further, the densification of the cathode through an increase in the calendering force applied to the coated electrode stock can result in a stretching of the metallic foil substrate mat functions as the cathode current collector. Such stretching can compromise the uniformity of the coating layer and can lead to wrinkling, cracking and ultimately the separation of all or portions of the coating layer from the substrate.

In the interest of accommodating the increase in volume relating to the reaction products for the lithium/iron disulfide electrochemical couple while also improving the cell discharge efficiency and cell capacity, it will therefore be appreciated that the volume occupied by non-reactive internal cell components should be minimized to the extent possible. In this regard, use of lithium metal foil as the anode obviates the need for a discrete anode current collector, since the lithium foil is sufficiently conductive. However, lithium foil has a relatively low tensile strength and as a result can undergo stretching and thinning causing localized regions of reduced anode capacity. In a pronounced case, the thinning can be aggravated to the point of disconnects within the lithium anode. Various solutions to the problem of lithium foil weakness have been proposed, including, the design of cells with thicker lithium foils, separate anode current collectors, or lithium anodes with regions of reduced or non-ionic transport. These solutions typically result in an anode overbalance in the cell and are not efficient or volumetrically satisfactory. The use of excess lithium in the cell is also costly since metallic lithium foil is a relatively costly material.

There is therefore a need for a nonaqueous lithium/iron disulfide cell with an increased energy density and discharge efficiency that accommodates the volume increase of the reaction products generated during discharge. There is further a need for such a nonaqueous cell having a dense cathode with good adhesion to the current collector substrate without sacrificing the uniformity of the cathode coating layer. There is further a need for such a nonaqueous cell that reduces the anode to cathode cell balance without sacrificing the integrity of the anode.

DRAWINGS

FIG. 1 is an illustration of an anode and a cathode and the interfacial electrode width.

DESCRIPTION OF THE PREFERRED EMBODIMENT

This invention relates to a nonaqueous cell comprising a lithium metallic foil anode and a cathode coating comprising iron disulfide as the active material wherein the coating is applied to at least one surface of a metallic substrate that functions as the cathode current collector. In particular, the cell of the within invention has improved performance on high rate discharge and is achieved, surprisingly, with an anode underbalance. Said another way, the cell of the within invention has an anode to cathode input ratio, as defined herein, that is less than or equal to 1.0. We have discovered, unexpectedly, that the energy density for the cell both volumetrically and gravimetrically can be improved by approximately 20 to 25% while only increasing the volume of the cathode coating solids by approximately 10% through a unique and novel cathode coating formulation.

Preferably, the cathode coating formulation of the cell of the within invention is used in conjunction with a lithium metallic foil anode. The preferred anode is a lithium-aluminum alloy. The aluminum content by weight is preferably between 0.1 and 2.0 percent, and still more preferably is between 0.1 and 0.9 percent. In the preferred embodiment, the aluminum content of the lithium foil anode material is 0.5 percent. Such an alloy is available commercially from, by way of example, Chemetall Foote Corporation or FMC Corporation. We have found that the use of this alloyed material in conjunction with the cathode slurry formulation described below, enables the amount of lithium utilized in the cell to be minimized. The alloyed lithium results in an increase in tensile strength. In a cell of the within invention where, for example, the electrodes are wound together into a jellyroll electrode assembly, the increase in tensile strength in the lithium aluminum alloy translates into a material stretch of less than 0.5 percent over a 12.0 inch initial electrode length. This in turn means that anode discontinuities along the length of the wound electrode strip are minimized, contributing to an improvement in overall cell performance. We have also observed that the solid electrolyte interface film (or SEI) that forms during the initial reaction of the alloyed lithium anode with organic solvents used in the electrolyte exhibits less ionic transfer resistance than the SEI film that forms using an unalloyed lithium anode.

The cathode slurry formulation of the cell of the within invention is novel and unique in that it enables the creation of a denser cathode, an anode to cathode input ratio of 1.0 or less and an increase in the cell energy density without sacrificing the discharge efficiency of the cell or the cathode integrity or the adhesion of the dried cathode slurry to the metallic foil substrate. With regard to the cathode slurry formulation, we have discovered that proper selection of the conductive additives allows for a reduction in the amount of solvent utilized, resulting in a reduction of void volume in the final electrode coating and a denser cathode. We have further discovered that through the incorporation of certain slip agents and rheological modifiers, the calendering force required to achieve the desired cathode porosity and coating thickness can be minimized, further enabling the anode to cathode input ratio of the cell of the within invention.

The preferred cathode slurry formulation of the cell of the within invention comprises conductive carbon materials as additives. Preferably, the conductive carbon additives comprise a mixture of synthetic graphite and acetylene black. We have discovered that certain beneficial effects can be achieved by incorporating a synthetic graphite that is highly crystalline and possess an extreme anisotropic character to provide a powder with a moderate to low surface area and structure and that also has a high purity level (hereinafter referred to as "highly crystalline synthetic graphite"). The moderate to low surface area and structure are characteristics of particular importance, as reflected in BET and DBP values as defined below, since we have discovered that carbons with higher surface areas and structures tend to retain solvent, ultimately contributing to coating defects. A suitable highly crystalline synthetic graphite has a maximum impurity or ash level of 0.1 percent, a mean particle size of 9 microns and a BET surface area of approximately 10 $m^2$/gm and a n-dibutyl phthalate, or DBP oil absorption ratio of 190 percent as per ASTM D2414 and is available commercially from Timcal Graphite as Timrex MX-15. "BET" refers to ASTM D6556, which correlates surface area with multipoint nitrogen gas adsorption. A preferred highly crystalline synthetic graphite has an impurity level of 0.01 to 0.2 percent, a mean particle size of 3.0 to 11.0 microns, a BET surface area of 3.0 to 11.0 $m^2$/gm and a DBP ratio of 160 to 200 percent.

The acetylene black is preferably 55% compressed and is available commercially from, for example, Chevron under the product name acetylene black C55.

In the preferred cathode slurry formulation, the amount of conductive carbon additives is from 7.0 to 11.0 volume percent of the total solids content and still more preferably is from 10.0 to 10.5 volume percent of the total solids content. The "solids content" and the "solids percent" as used herein refers to the dry cathode coating formulation without consideration of the solvent, while the "wet content" and the "wet percent" refers to the cathode coating formulation taking into consideration the solvent used. We have further discovered that in determining the appropriate amount of carbon additives, the level of highly crystalline synthetic graphite should be maximized while the level of acetylene black should be minimized, to avoid undesired electrolyte retention that results in an increased difficulty in processing the electrode. Therefore, preferably the volume of highly crystalline synthetic graphite exceeds the volume of acetylene black, on both a wet and a dry or solids basis. Still more preferably, the volume of highly crystalline synthetic graphite is at least twice the volume of acetylene black, again on a wet and solids basis. In the preferred formulation, the solids volume percent of highly crystalline synthetic graphite is between 7.0 and 7.5, while the solids volume percent of acetylene black is between 3.0 and 3.5. Still more preferably, the solids volume percent of highly crystalline synthetic graphite is 7.39 and the solids volume percent of acetylene black is 3.05. On a solids weight percent basis, acetylene black is preferably from 1.0 to 3.0 percent, highly crystalline synthetic graphite is preferably from 3.0 to 6.0 weight percent.

The preferred cathode slurry formulation of the within invention further comprises at least one rheological modifier to aid in electrode processing. We have discovered that a cathode slurry comprising such a modifier with a high sensitivity to shear stress further enables the dense cathode and the anode to cathode input ratio of the cell of the within invention. Particularly desirable is an additive that will aid the slurry in retaining its viscosity while in an undisturbed state but will cause a drop in the slurry viscosity when the slurry is subjected to a relatively high shear such as can be encountered during the process of transferring the slurry from a holding tank to the electrode substrate. The preferred modifier further aids the slurry in returning to the relatively higher viscosity once the shear stress is removed. We have discovered that the incorporation of fumed silica into the cathode slurry of the cell of the within invention provides the above described shear sensitivity. The preferred silica has a silanol group surface concentration of between 0.5 and 1.0 mmol/gm, and most preferably between 0.70 and 0.80 mmol/gm. The fumed silica preferably is added in an amount of from 0.2 to 0.6 weight percent of the solids incorporated into the slurry formulation, with a bulk density of from 35.0 to 50.0 gm/liter. A suitable fumed silica additive is available commercially from, for example, Degussa Corporation and is known as Aerosil 200, having a bulk density of 45.0 to 50.0 gms/liter. In a preferred formulation, the fumed silica comprises 0.3 weight percent of the solids.

In the preferred cathode slurry formulation, micronized TEFLON®, or micronized polytetrafluoroethylene (PTFE) is incorporated as a slip agent. The micronized TEFLON® preferably has a mean particle size of 2.0 to 4.0 microns and a maximum particle size of 12.0 microns. The preferred micronized TEFLON® is easily dispersed in coating formulations and has been processed to a 1.0 to 1.5 NPIRI grind, where NPIRI stands for National Printing Ink Research Institute. Micronized TEFLON® is preferably incorporated from 0.2 to 0.6 weight percent of the total weight of the solids in the slurry, and still more preferably is added at 0.3 weight percent. A suitable preferred micronized TEFLON® is manufactured by MicroPowders Inc. and is available commercially from Dar-Tech Inc. under the name Fluo HT.

The anode to cathode input ratio as used herein can be calculated as follows:

Anode Capacity Per Linear Inch:

(foil thickness)×(interfacial electrode width)×1 inch×(density of lithium foil at 20° C.)×(lithium energy density, 3861.7 mAh/gm).

Cathode Capacity Per Linear Inch:

(final cathode coating thickness)×(interfacial electrode width)×1 inch×(cathode dry mix density)×(final cathode packing percentage)×(dry weight percent $FeS_2$)×(percent purity FeS2)×($FeS_2$ energy density, 893.58 mAh/gm)

Anode/cathode input ratio-anode capacity per linear inch/cathode capacity per linear inch "Interfacial electrode width" as used herein is the linear dimension that shares an interfacial area between the cathode and the anode. An example is illustrated in FIG. 1, where the dimension labeled "A" is the interfacial electrode width. "Final cathode coating thickness" refers to the coating thickness after any calendering operation or other densification processing of the cathode. "Final cathode packing percentage" refers to the solid volume percentage after any calendering operation or other densification processing and is equivalent to 100 percent less the void volume percentage after any calendering operation or other densification processing of the cathode. The "cathode dry mix density" refers to the additive density of the solid components of the cathode coating.

A preferred polymer binder for the cathode coating of the cell of the within invention is a styrene-ethylene/butylene-styrene (SEBS) block copolymer. One such suitable block copolymer is available commercially from Kraton Polymers of Houston, Tex. as Kraton G1651. The preferred solvent for use with such a binder is stabilized 1,1,2-trichloroethylene. One of skill in the art will appreciate that other combinations of binders and/or solvents may be utilized in the cathode coating of the cell of the within invention without departing from the scope of the within invention

EXAMPLE

An electrochemical cell comprising lithium as the active anode material and pyrite as the active cathode material is constructed as follows. A continuous strip of lithium metal foil 0.006 inches thick by 1.535 inches wide and alloyed at 0.5 weight percent with aluminum is provided. An aluminum cathode current collector continuous strip 0.001 inches thick by 1.72 inches wide is provided. The aluminum cathode collector strip is full hard standard alloy 1145-H19 aluminum and both surfaces are flame cleansed to remove oils and improve adhesion of the coating to the substrate surface.

A cathode coating slurry is prepared using the following solids:

| Material | Weight percent (dry) | $cm^3$/100 gms |
|---|---|---|
| FeS2 | 92.0 | 19.087 |
| Acetylene black | 1.4 | 0.733 |
| Highly crystalline synthetic graphite | 4.0 | 1.777 |
| Formed silica | 0.3 | 0.136 |
| Micronized PTFE | 0.3 | 0.136 |
| Kraton | 2.0 | 2.198 |
| | | 24.067 $cm^3$/100 gms<br>4.155 $gm/cm^3$ |

Battery grade iron pyrite with a purity level of 95 percent by weight available from Chemetall is sieved through a 230 mesh screen to remove particles with a dimension greater than 62 microns. The sieved pyrite is weighed along with conductive carbon additives and fumed silica, wetted with a 1,1,2-trichloroethylene solvent and mixed via a high speed disc mixer. Once thoroughly wetted and blended, the polymer binder is added to the mixer and blended until dissolved uniformly in the mixture. Micronized PTFE is then blended into the mixture and additional solvent is incorporated to reach a desired viscosity suitable for the particular coating operation. In this example, the final slurry viscosity is in the range of 2900 to 4100 centipoise as measured using a Brookfield Viscometer.

The slurry is then applied to both sides of the continuous cathode aluminum strip substrate in a roll coating operation. The coating is applied to the cathode substrate so as to leave an uncoated band along one edge of both sides of the substrate in the web direction that is referred to as the mass free zone 1 as shown in FIG. 1. The wet coating is applied to a thickness of 0.00565 inches by 1.605 inches wide on each side of the cathode collector strip. After drying, the cathode strip undergoes a densification process in a calendering operation for a reduction to approximately 0.00315 inches on each side of the 0.001 inch thick substrate. The resulting cathode coating has a solids packing factor of approximately 64 percent. The anode to cathode input ratio can be determined as follows:

Cathode capacity per linear inch:

(0.0063 in.)(1.535 in.)(1.0 in.)(16.387 $cm^3/in^3$) (4.1555 $gm/cm^3$)(0.64 solids packing) (0.92) (0.95)(893.58 mAh/gm )=329 mAh/linear inch Anode capacity per linear inch:

(0.006 in.)(1.535 in.)(1.0 in.)(16.387 $cm^3/in^3$)(0.534 $gm/cm^3$)(3861.7 mAh/gm)=311 mAh/linear inch The resulting anode to cathode input ratio is 311/329=0.95.

The anode, cathode and a suitable separator are wound together from continuous webs into an electrode assembly with an overwrap on the exterior of the jelly roll and disposed within a can or other suitable container. A plastic insulating disc is punched and placed into each can initially. Automatic winders initiate the jellyroll with separator, followed by the cathode. The anode is introduced into the winder after the cathode and the jellyroll is formed to predetermined electrode lengths based on the location of the anode tab. The winder feed stock is separated from the web and an overwrap film is introduced into the winder at the trail end of the jellyroll and wound over the jellyroll until a predetermined jellyroll diameter is obtained. The wrap is cut and heat sealed, the cathode collector is crimped and the jellyroll is inserted into the container. The can is swaged to reduce its diameter prior to electrolyte filling.

Conventional cell assembly and closing methods are utilized to complete the final cell, followed by a predischarge regimen. The anode tab is a 0.002 inch thick nickel plated steel foil tab that is pressure bonded to the lithium foil web at predetermined intervals corresponding to the predetermined prewind anode length of 12.00 inches and is bent over the completed jellyroll prior to insertion of the jellyroll into the can. The separator is a 25 micron thick polypropylene material available from Celgard Corporation as Celgard 2400. The can is nickel plated steel with an outer diameter of 0.548 inches and the jellyroll finished diameter is 0.525 inches. The outer wrap is a polypropylene film. The electrolyte is 1.6 grams of 63.05 weight percent 1,3 dioxolane, 27.63 weight percent 1,2 dimethoxyethane, 0.18 weight percent 3,5 dimethylisoxazole, and 9.14 weight percent lithium iodide.

What is claimed is:

1. An electrochemical cell comprising a nonaqueous electrolyte, an anode and a cathode assembly, the electrolyte comprising a solvent, the cathode assembly comprising a metallic cathode current collector having two major surfaces and a cathode coating disposed on at least one of the two major surfaces, the coating comprising iron disulfide, and the anode comprising metallic lithium, wherein the *interfacial* anode to cathode input ratio is less than or equal to 1.0.

2. The cell of claim 1, wherein the metallic lithium is alloyed with aluminum.

3. The cell of claim 2, wherein the metallic lithium comprises less than 1.0 percent by weight of aluminum.

4. The cell of claim 3, wherein the metallic lithium comprises between 0.1 and 0.9 percent by weight aluminum.

5. The cell of claim 4, wherein the metallic lithium comprises 0.5 percent by weight of aluminum.

6. The cell of claim 1, wherein the cathode coating further comprises a void volume of less than 43 percent.

7. The cell of claim 6, wherein the void volume is from 36 percent to 42 percent.

8. The cell of claim 7, wherein the cathode coating further comprises synthetic graphite.

9. The cell of claim 8, wherein the synthetic graphite is highly crystalline synthetic graphite.

10. The cell of claim 9, wherein the highly crystalline synthetic graphite has a mean particle size of 3.0 to 11.0 microns, a BET surface area of 3.0 to 11.0 $m^2$/gm and an n-dibutyl phthalate oil absorption ratio of 160 to 200 percent.

11. The cell of claim 7, wherein the cathode coating further comprises acetylene black.

12. The cell of claim 7, wherein the cathode coating further comprises a micronized polytetrafluoroethylene powder.

13. The cell of claim 12, wherein the cathode coating further comprises a styrene-ethylene-butylene-styrene block copolymer.

14. The cell of claim 13, wherein the cathode coating further comprises fumed silica.

15. An electrochemical cell comprising a nonaqueous electrolyte, an anode and a cathode assembly, the cathode assembly comprising a metallic cathode current collector having two major surfaces and a cathode coating disposed on at least one of the two major surfaces, the cathode coating comprising iron disulfide, fumed silica, acetylene black and synthetic graphite, and the anode comprising metallic lithium.

16. The cell of claim 15, wherein the synthetic graphite and the acetylene black together comprise between 7.0 and 11.0 volume percent of the total solids content of the cathode coating.

17. The cell of claim 16, wherein the synthetic graphite and the acetylene black together comprise between 10.0 and 10.5 volume percent of the total solids content of the cathode coating.

18. The cell of claim 17, wherein the solids volume percent of the synthetic graphite is at least twice the solids volume percent of the acetylene black.

19. The cell of claim 15, wherein the synthetic graphite has a mean particle size of 3.0 to 11.0 microns, a BET surface area of 3.0 to 11.0 $m^2$/gm and an n-dibutyl phthalate oil absorption ratio of 160 to 200 percent.

20. The cell of claim 15, wherein the cathode coating further comprises a micronized polytetrafluoroethylene powder.

21. The cell of claim 20, wherein the cathode coating further comprises a styrene-ethylene-butylene-styrene block copolymer.

22. The cell of claim 15, wherein the metallic lithium is alloyed with aluminum.

23. The cell of claim 18, wherein the cathode coating further comprises micronized polytetrafluoroethylene, and a styrene-ethylene-butylene-styrene block copolymer, and the synthetic graphite comprises highly crystalline synthetic graphite.

24. The cell of claim 23, wherein the cathode components are present in the following solids weight percents: iron disulfide 90.0 to 94.0 percent; acetylene black 1.0 to 3.0 percent; synthetic graphite 3.0 to 6.0 percent; polytetrafluoroethylene 0.2 to 0.6 percent; silica 0.2 to 0.6 percent; SEBS block copolymer 1.5 to 3.0 percent.

*25. The cell of claim 2, wherein the cathode coating has a void volume of less than 43 percent.*

*26. The cell of claim 1, wherein the anode to cathode input ratio is less than or equal to 0.95.*

*27. The cell of claim 1, wherein the cathode coating further comprises a conductive carbon material.*

*28. The cell of claim 27, wherein the conductive carbon material is synthetic graphite.*

*29. The cell of claim 28, wherein the synthetic graphite is highly crystalline synthetic graphite.*

*30. The cell of claim 27, wherein the conductive carbon material is acetylene black.*

*31. The cell of claim 1, wherein the cathode coating further comprises a rheological modifier.*

*32. The cell of claim 31, wherein the rheological modifier comprises a silanol group.*

*33. An electrochemical cell comprising:*

*a nonaqueous electrolyte comprising at least one solvent;*

*a jellyroll electrode assembly having an anode and a cathode assembly wound together;*

*wherein the cathode assembly comprises a metallic cathode current collector with two major surfaces and a cathode coating comprising iron disulfide disposed on at least one of said two major surfaces; and*

*wherein the anode comprises metallic lithium; and*

*wherein an interfacial anode to cathode input ratio for the jellyroll electrode assembly is less than 1.0.*

*34. The electrochemical cell according to claim 33, wherein the anode to cathode input ratio is less than or equal to 0.95.*

*35. The electrochemical cell according to claim 33, wherein the metallic lithium is alloyed with aluminum.*

*36. The electrochemical cell according to claim 35, wherein the anode to cathode input ratio is less than or equal to 0.95.*

*37. The electrochemical cell according to claim 35, wherein the anode comprises between about 0.1 and 2.0 percent by weight of aluminum.*

*38. The electrochemical cell according to claim 33, wherein the jellyroll electrode assembly also has an outer wrap comprising polypropylene.*

*39. The electrochemical cell according to claim 33, wherein the cathode coating has a void volume of less than 43 percent.*

*40. The electrochemical cell according to claim 33, wherein the cathode coating further comprises a conductive carbon material.*

*41. The cell of claim 40, wherein the conductive carbon material is highly crystalline synthetic graphite.*

*42. The cell of claim 40, wherein the conductive carbon material is acetylene black.*

*43. The cell of claim 33, wherein the cathode coating further comprises a rheological modifier.*

*44. The cell of claim 43, wherein the rheological modifier comprises a silanol group.*

*45. The cell of claim 33, wherein the jellyroll electrode assembly has a diameter of at least about 0.525 inches.*

*46. The cell of claim 33, wherein the jellyroll electrode assembly further comprises an anode tab.*

*47. The cell of claim 46, wherein the anode tab is bent over the jellyroll electrode assembly.*

*48. The cell of claim 1, wherein the interfacial anode to cathode input ratio=anode capacity per linear inch/cathode capacity per linear inch; wherein the anode capacity per linear inch=(foil thickness)×(interfacial electrode width)×(density of lithium foil at 20° C.)×(lithium energy density, 3861.7 mAh/g); and wherein the cathode capacity per linear inch=(final cathode coating thickness)×(interfacial electrode width)×(cathode dry mix density)×(final cathode packing percentage)×(dry weight percent $FeS_2$)×(percent purity $FeS_2$)×($FeS_2$ energy density, 893.58 mAh/g).*

*49. The cell according to claim 48, wherein the metallic lithium is alloyed with aluminum.*

*50. The cell according to claim 48, wherein the metallic lithium comprises less than 1.0 percent by weight of aluminum.*

*51. The cell according to claim 50, wherein the metallic lithium comprises between 0.1 and 2.0 percent by weight of aluminum.*

*52. The cell according to claim 51, wherein the metallic lithium comprises about 0.5 percent by weight of aluminum.*

*53. The cell according to claim 48, wherein the cathode coating further comprises a void volume of less than 43 percent.*

*54. The cell according to claim 56, wherein the void volume is from 36 percent to 42 percent.*

*55. The cell according to claim 48, wherein the cathode coating further comprises synthetic graphite.*

*56. The cell according to claim 55, wherein the synthetic graphite has a mean particle size of 3.0 to 11.0 Pm, a BET surface area of 3.0 to 11.0 $m^2/g$, and a DBP of 160 to 200 percent.*

*57. The cell according to claim 48, wherein the cathode coating further comprises acetylene black.*

*58. The cell according to claim 48, wherein the cathode coating further comprises a micronized polytetrafluoroethylene powder.*

*59. The cell according to claim 48, wherein the cathode coating further comprises a styrene-ethylene-butylenestyrene block copolymer.*

*60. The cell according to claim 48, wherein the cathode coating further comprises fumed silica.*

*61. The cell according to claim 48, wherein the cathode coating further comprises a total of between 7.0 and 11.0 percent synthetic graphite and acetylene black, based on the total solids content of the cathode coating.*

*62. The cell according to claim 48, wherein the synthetic graphite and the acetylene black together comprise between 10.0 and 10.5 volume percent of the total solids content of the cathode coating.*

*63. The cell according to claim 48, wherein the solids volume percent of the synthetic graphite is at least twice the solids volume percent of the acetylene black.*

*64. The cell according to claim 48, wherein the electrolyte comprises an organic solvent.*

*65. The cell according to claim 48, wherein the cathode assembly and the anode are wound together into a jellyroll electrode assembly.*

* * * * *